United States Patent [19]

Heltzel et al.

[11] 3,986,708
[45] Oct. 19, 1976

[54] MOBILE BATCHING PLANT

[75] Inventors: Robert E. Heltzel; Richard K. Brugler, both of Warren, Ohio

[73] Assignee: Heltzel Company, Warren, Ohio

[22] Filed: June 23, 1975

[21] Appl. No.: 589,523

[52] U.S. Cl. .............................. 259/154; 214/17 R
[51] Int. Cl.² .......................................... B01F 5/42
[58] Field of Search ............... 259/154, 161, 159 A; 214/17 R

[56] References Cited
UNITED STATES PATENTS

| | | | |
|---|---|---|---|
| 3,049,248 | 8/1962 | Heltzel et al. | 214/17 R |
| 3,295,698 | 1/1967 | Ross et al. | 259/154 X |
| 3,343,688 | 9/1967 | Ross | 259/154 X |
| 3,466,018 | 9/1969 | Nourse | 259/154 X |
| 3,820,762 | 6/1974 | Bostrom | 259/154 |

*Primary Examiner*—Samuel B. Rothberg
*Attorney, Agent, or Firm*—Wilkinson, Mawhinney & Theibault

[57] ABSTRACT

The present disclosure is directed to a mobile batching plant having a primary frame carrying the cement storage, batching and weighing system and a plurality of rigidly connectable and detachable secondary modular frames connected in tandem each secondary modular frame carrying a combination batch and storage hopper having dispensing gates with an endless aggregate conveyor beneath the hopper gates. One sand and from one to three aggregate modules can be carried without affecting plant width. A fifth wheel for connection to a tractor is carried by the primary frame and a transport wheel assembly is connected to the last modular frame to render the entire plant transportable over the highway. The hoppers carried by the modular secondary frames are loadable by a small front end loader without the need of ramps because of their low profile. The cement batcher and discharge screw are supported on a scale system to weigh precisely the cement dispensed and each hopper carried by the modular secondary frame is supported by a scale system to weigh exactly the amount of sand and aggregates dispensed upon the endless aggregate conveyor.

A pivotal cement storage bin is connected to the cement module frame in a vertical position to feed cement to the cement batching and weighing system. In travel position the cement bin is pivoted to a horizontal position and supported by the aggregate modular frame.

8 Claims, 12 Drawing Figures

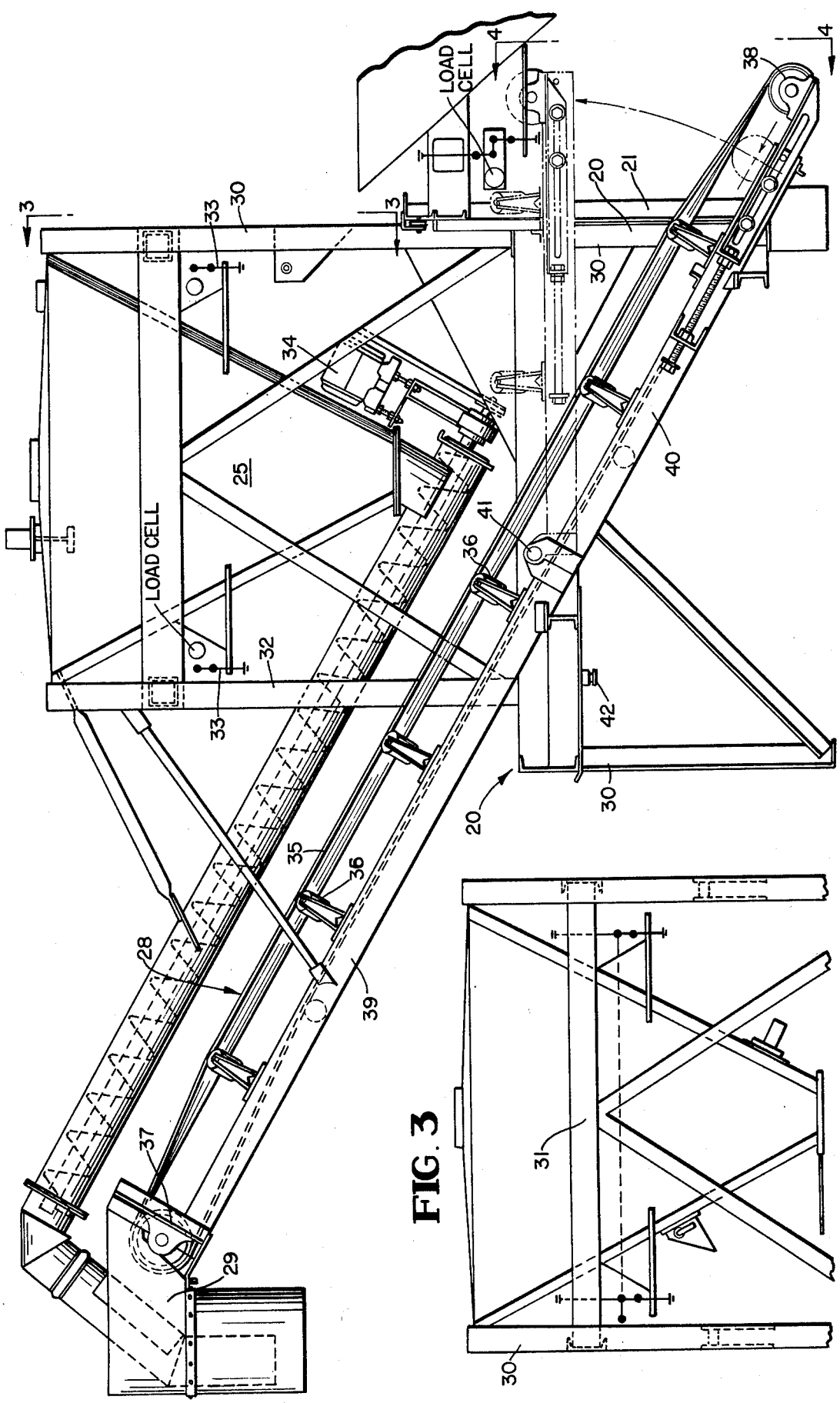

MOBILE BATCHING PLANT

THE PRIOR ART

Mobile batching plants as such are not new in the art. Tractor transported plants for over the highway transport have been known for example U.S. Pat. Nos. 3,049,248; 3,064,832; 3,154,202 and 3,317,194 which have filled a need for transportability; however these patented structures have not filled the need of compactability, expansibility, simplicity of structure, ease of charging and accuracy of weighing and low construction cost.

An object of the present invention is the provision of a modular constructed highway transport vehicle which has a minimum of height in transport for bridge and tunnel clearances and minimum width since some states strictly regulate wide loads.

Another object of the present invention is the provision of a structure which can be easily elongated to accommodate batch mixes of plural sands and aggregates without increasing either height or width of the road transportable vehicle while holding construction cost to a minimum.

A further object of the present invention is a mobile batch plant providing a plurality of sand or aggregate hoppers of low profile which can be charged on the job site by a small inexpensive bucket loader not requiring special loading ramps.

A still further object of the present invention is the provision of standardized modular hoppers or bins for reduced fabricated costs which are adaptable to volumetric-type continuous feed applications.

A further object of the present invention is a plant of the type described hereinbefore which is easily adapted to various concrete mixing applications, having fewer mechanical components such as gates, less maintenance and less air consuming equipment which also features no cement on the belt, easy and fast to erect and which may be operated by a single man.

With the foregoing and other objects in view the invention will be more fully described hereinafter and more particularly pointed out in the appended claims.

In the drawings in which like parts are denoted by reference characters throughout the several views:

FIG. 2 is a side elevational view of the primary frame and the cement hopper and conveyor module with the second aggregate conveyor mounted thereon.

FIG. 3 is a transverse section taken on the lines 3—3 in FIG. 2.

Figure 1A:
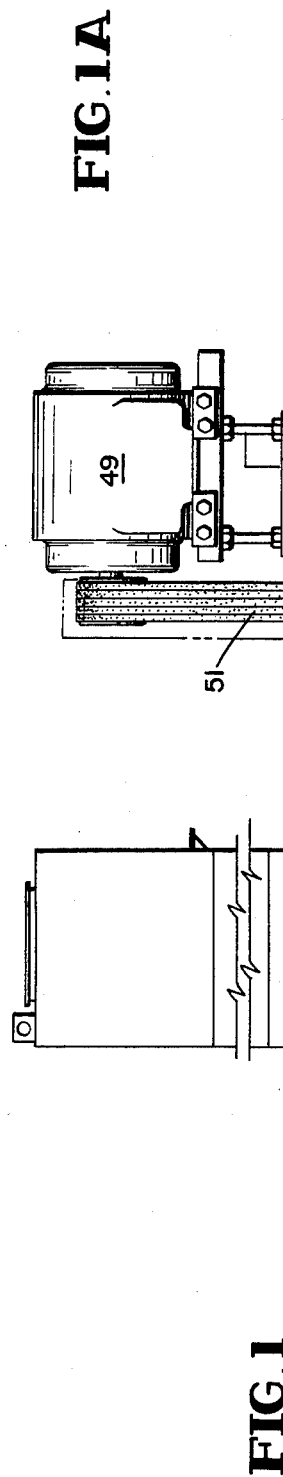
FIG. 1A is an end view of the upper end of the second aggregate conveyor showing its drive means taken on the lines 1A—1A in FIG. 1.

Referring now to the drawings, 20 designates the primary frame, to which are bolted for separable connection the modular secondary frames 21 which support in weighing relationship the sand and aggregate hoppers 22 and the cement module frame 30. The cement storage is shown at 23 pivotally connected to the cement module frame 30 at 24 to discharge cement into a cement weigh hopper 25 which charges a cement conveying screw 26. Bolted to the rear of the primary frame 20 is the first of a plurality of the modular secondary frames 21 having hoppers 22 which discharge sand and aggregates onto a first aggregate conveyor means 27 which is driven from a second aggregate conveyor means 28 which elevates the sand and/or aggregate up to the mixing means 29 where the cement from screw 26 and the aggregates from the second aggregate conveyor are joined with a water hose for discharge and blending in a stationary mixer or truck mixer.

THE PRIMARY FRAME

Cement Storage, Weighing and Conveying Means

Figure 4:
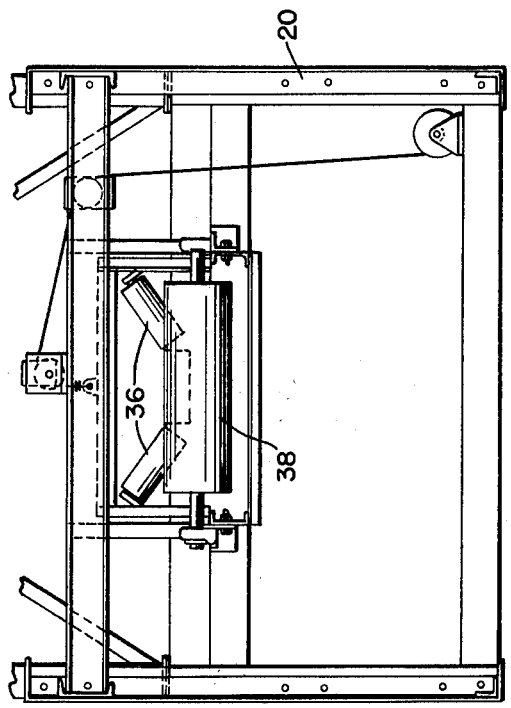
FIG. 4 is a transverse section taken on the lines 4—4 in FIG. 2.
Figure 7:
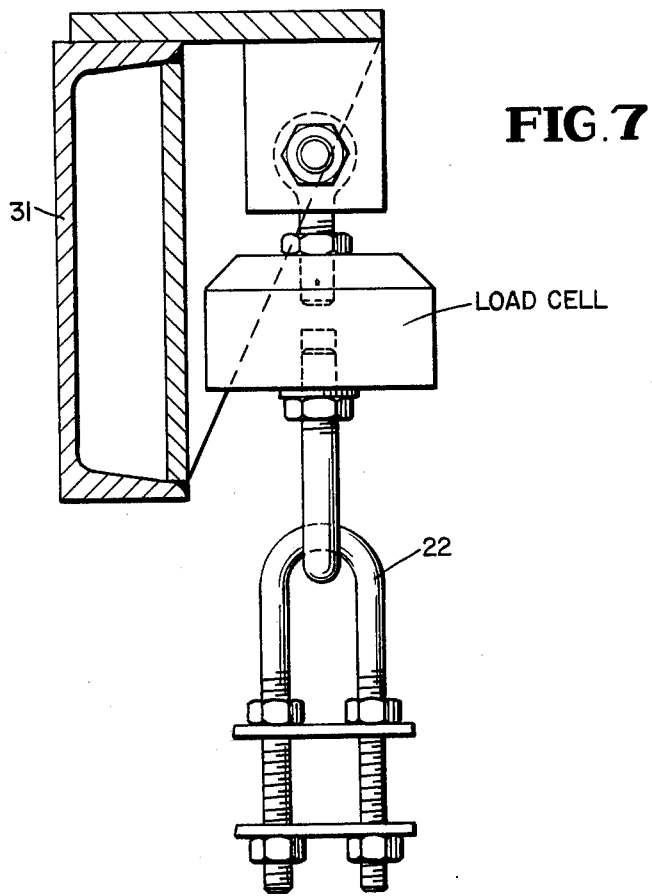
FIG. 7 is an end view of a load cell connected between the modular secondary frame and the aggregate or sand bin scale carried therefor.

Referring now to FIGS. 2, 3 and 4, the primary frame 20 supports cement module uprights 30 joined by transverse beams 31 to define a frame in which the cement weigh hopper 25 is mounted on the conventional scale beams 33 which actuate a cement load cell to produce an electrical value representative of the weight of the hopper, the cement screw 26 and its drive motor 34.

Second Aggregate Conveyor Means

Positioned beneath the cement screw 26 and suspended independently from the cement hopper module but carried by the primary frame 20 is the second aggregate conveyor means 28 having an endless belt 35 supported on rollers 36. The endless belt 35 is roved about end support rolls 37,38 journaled in frames 39,40 which are joined by a pivot 41. The lower portion 40 can be shortened from the solid line shown in FIG. 2 to the dotted line position when the lower portion is raised about the pivot 41 to the chain line position for over the highway transport. A fifth wheel 42 is mounted on the underside of the forward portion of the primary frame for connection to a tractor unit. Supported on the upper free end of the frame 39 is the chute means 29 into which the aggregate, cement and water are blended.

The great versatility and flexibility of the unit is in its modular secondary frames 21 which are detachably bolted to the primary frame 20 and to each other in tandem to make a rigid transport frame for the aggregate and sand hoppers 22 and the first aggregate conveyor means 27 carried therebeneath.

Plant Mobility and Stability

Figure 1:
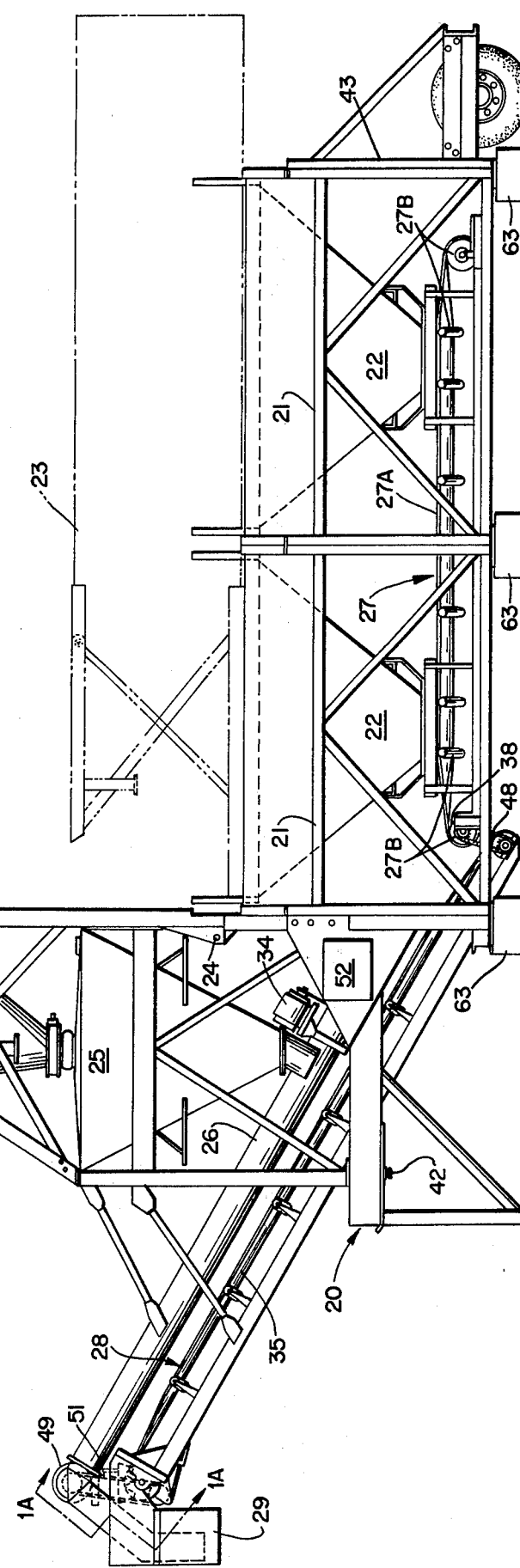
FIG. 1 is a side elevational view of the mobile batch plant of the present invention in the onsite condition with the cement storage bin in the erected condition in solid lines and shown in the transport condition in chain lines.

The fifth wheel 42 mounted on the underside of the forward portion of the primary frame is provided for draft connection to a tractor unit; while a rear transport wheel assembly 43 is bolted to the last of the modular secondary frames 21 as best seen in FIG. 1. When the mobile plant has been site located, stabilizer blocks 63 are put in position under vertical members of the frames 21 to provide load transfer surfaces over the ground and to provide stability to the plant.

MODULAR SECONDARY FRAMES

Figure 6:
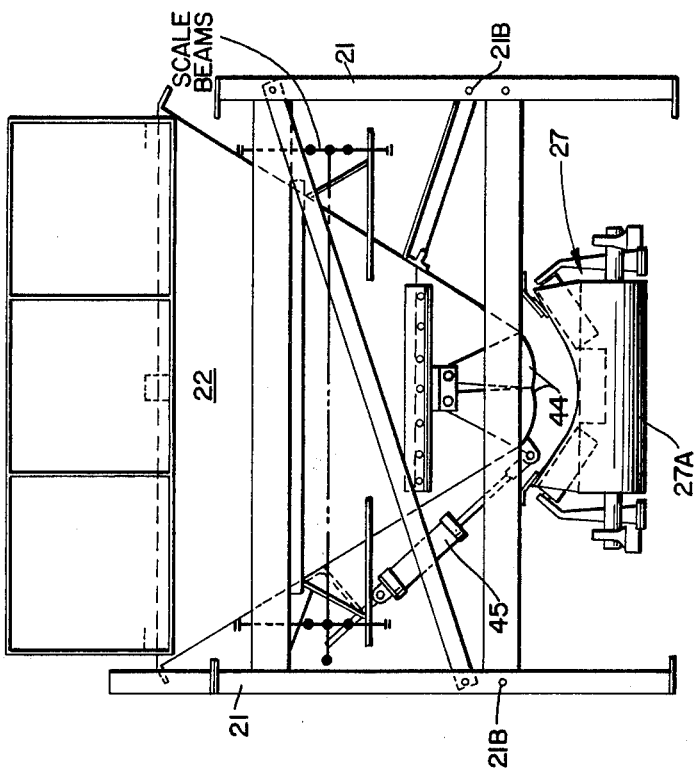
FIG. 6 is an end view of the units of FIG. 5 taken from the right hand end thereof.
Figure 5:
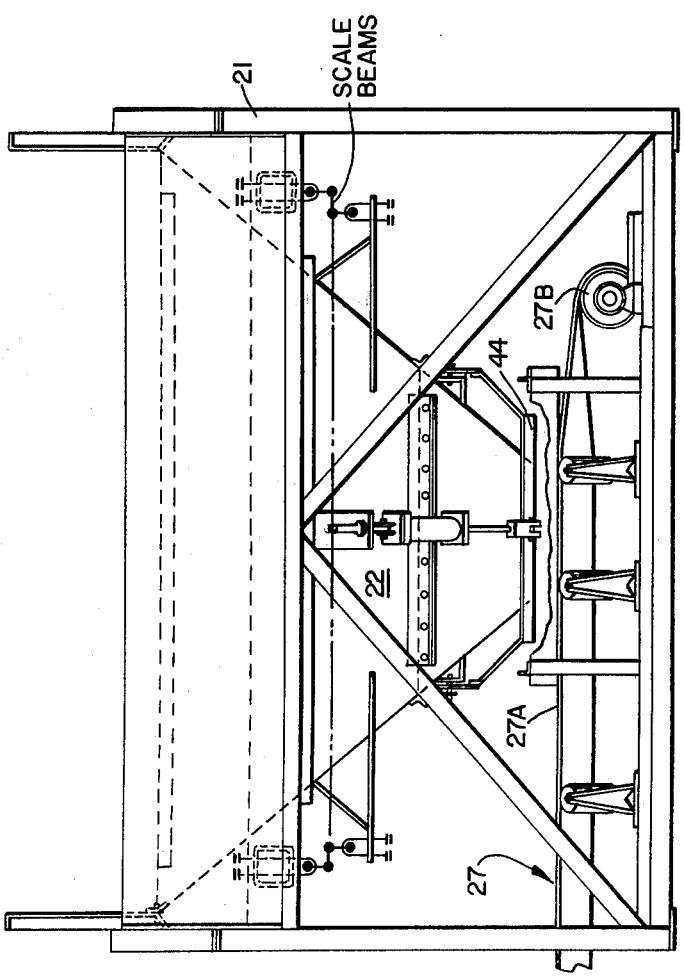
FIG. 5 is a side elevational view of the separable modular secondary frames having an aggregate hopper and dispensing gates therefor.

Referring now to FIGS. 5 and 6, the separable modular secondary frames 21 are rectangular both longitudinally as shown in FIG. 5 and transversely as shown in FIG. 6. The structural members are of welded construction and the end members 21 are of angle iron form having openings 21B therethrough to facilitate bolting of a plurality of frames 21, one to another as shown in FIG. 1 to define a rigid longitudinal frame to the last of which is bolted a rear transport wheel assembly 43.

Aggregate Hoppers

Each modular secondary frame 21 has aggregate hoppers 22 mounted on scale beams for actuating a load cell. Each hopper 21 has a pair of dispensing gates 44 actuated by a pneumatic cylinder 45. As best seen in FIG. 1 the leading modular frame unit 21 has a hopper 22 and bolted to it is another aggregate hopper frame 21. There may be in addition up to four aggregate modules. On units not furnished with the bolted rear transport wheel assembly 43 any number of aggregate modules can be added. In fact the number of bins 22 and their support frames may be added or subtracted to the frame in accordance with material requirements.

First Aggregate Conveyor Means

Referring now to FIGS. 1, 5 and 6, the first aggregate conveyor means 27 comprises an endless belt 27A supported upon rollers 27B and having its upper run passing beneath the bin dispensing gates 44. The belt 27A is passed about belt support rolls 27B. The first aggregate endless belt is driven from the second aggregate conveyor means by a sprocket and chain drive 48 between belt support rolls 38 and 27B. The length of the endless belt 27A will depend upon the number of modular frames 21 and their hoppers 22, that is how many aggregate materials are provided for.

There are only two solid feed motor drives on the plant; i.e. the cement screw drive motor 34 and the first and second aggregate conveyor belt drive motor 49. The motor 49, FIGS. 1 and 1A, is mounted on the upper end of frame 39 and drives belt roll 37 through a gear reducer 50 driven by V-belts 51.

Electrical Control System

The plant is under the control of a central control panel 52 which may be either on the side of the primary frame or in a control room to protect the plant operator from weather conditions. The only limitation is the length of the control cable.

Figure 8:
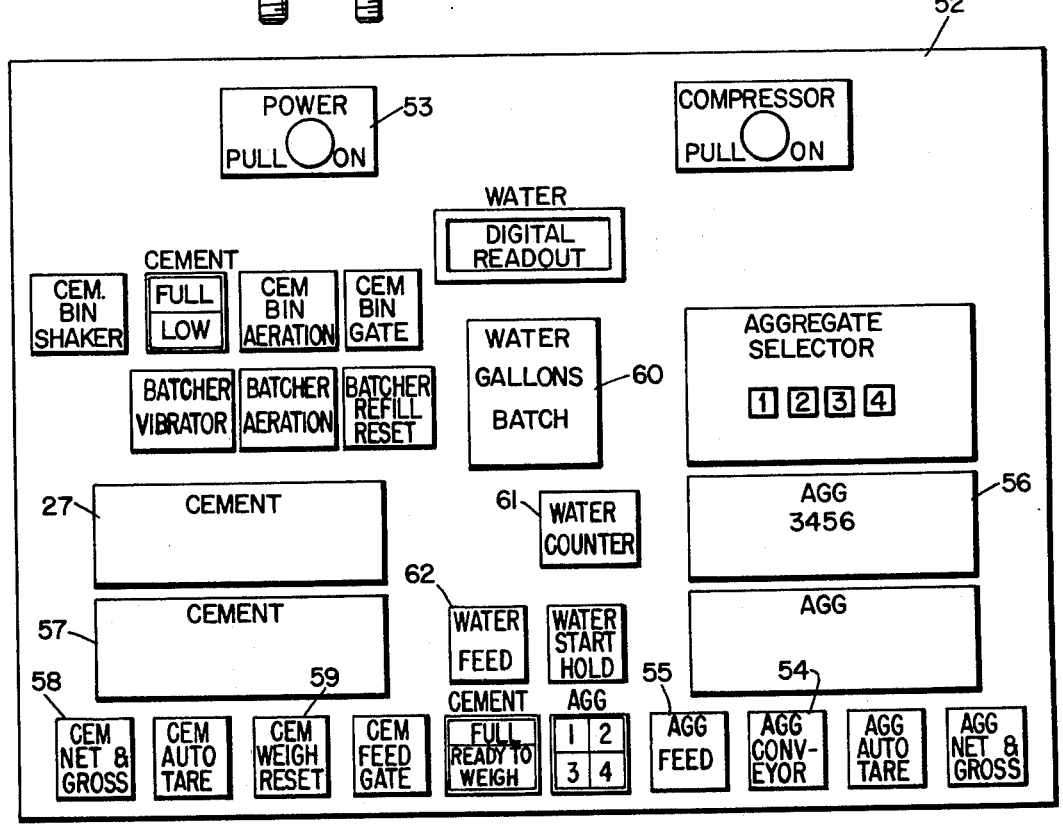
FIG. 8 is a front elevational view of the control panel for operating the plant of FIG. 1.
Figure 9:
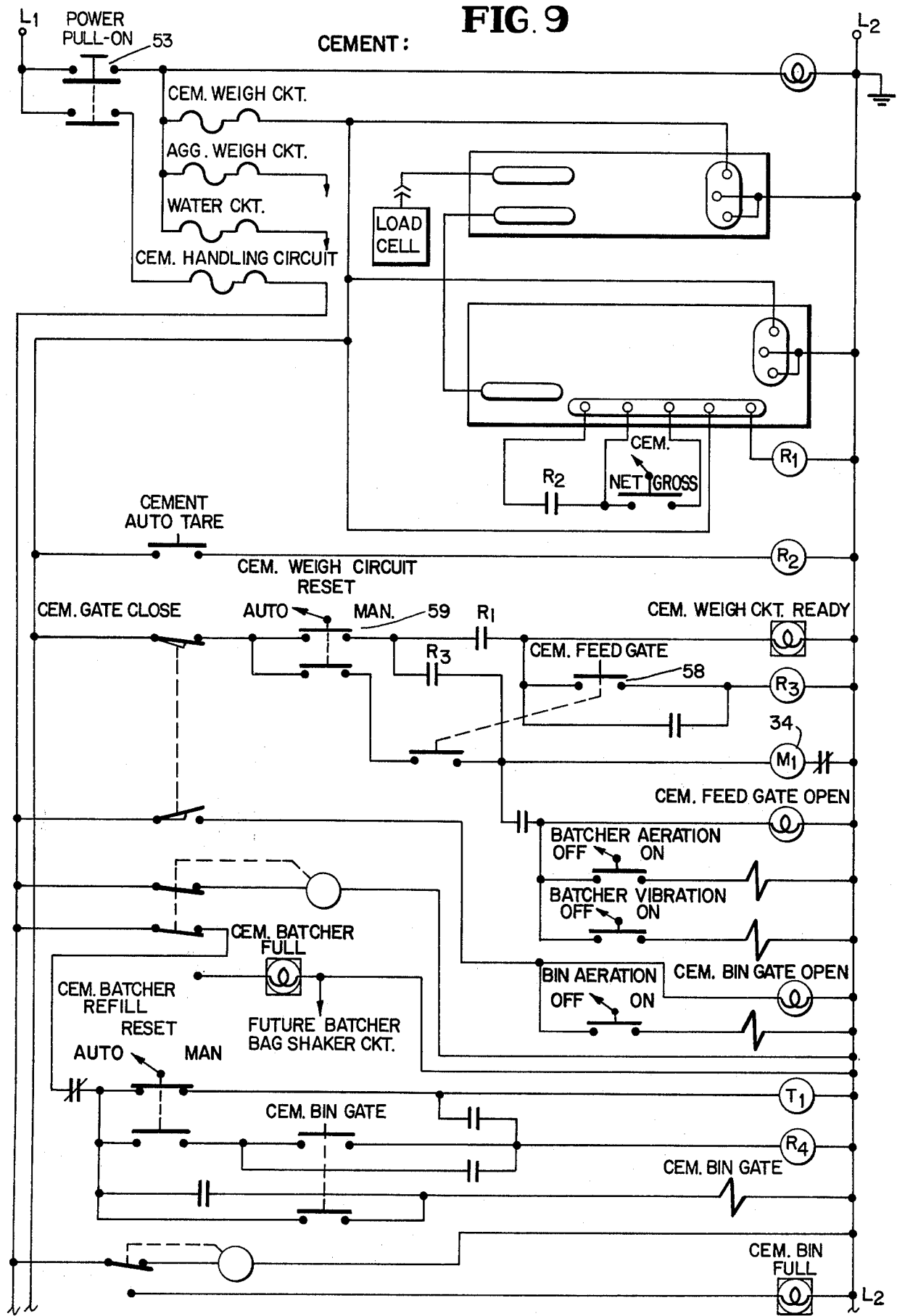
FIGS. 9, 10 and 11 are the electrical schematics for operating the cement, aggregate and water respectively.
Figure 10:
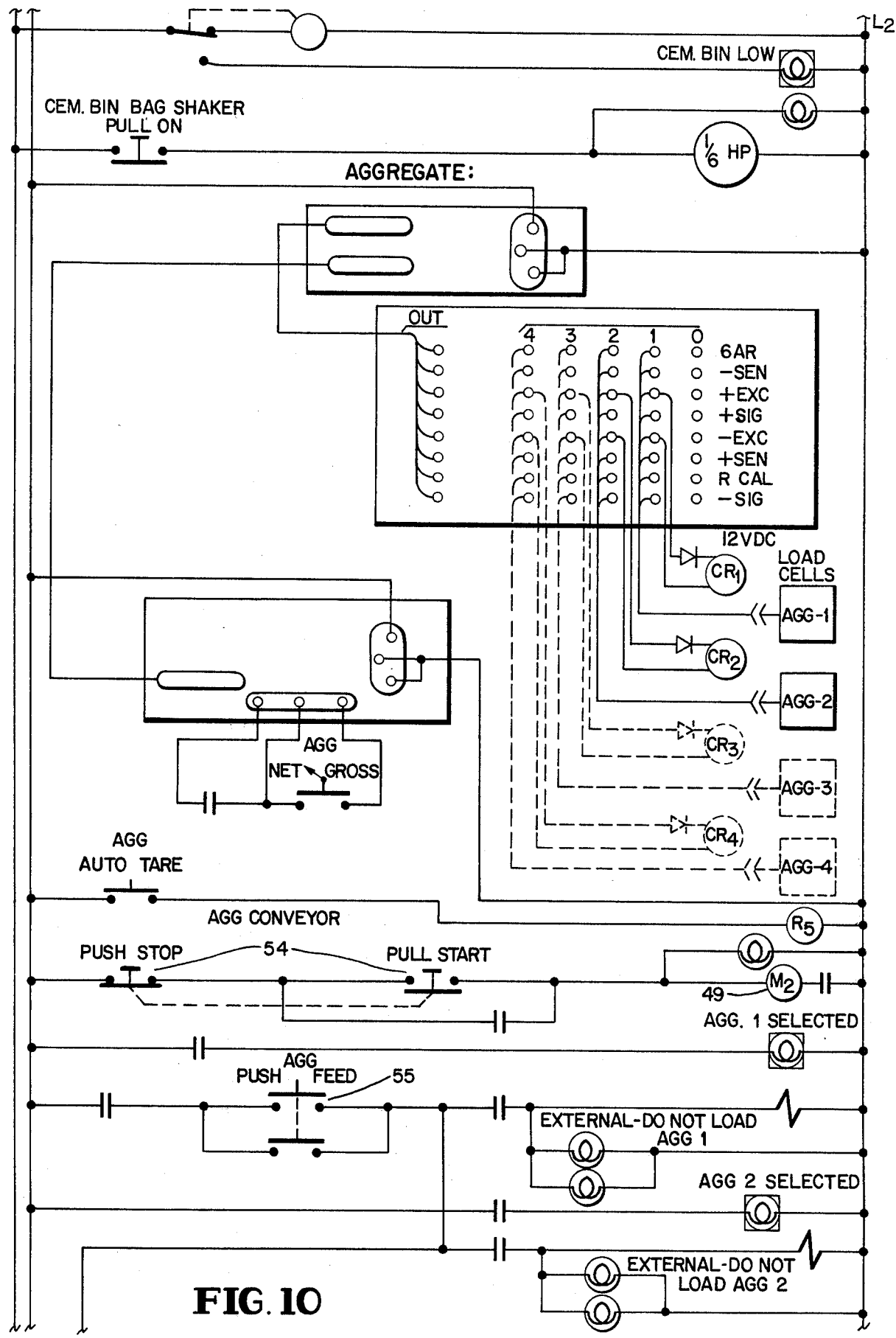
Figure 11:
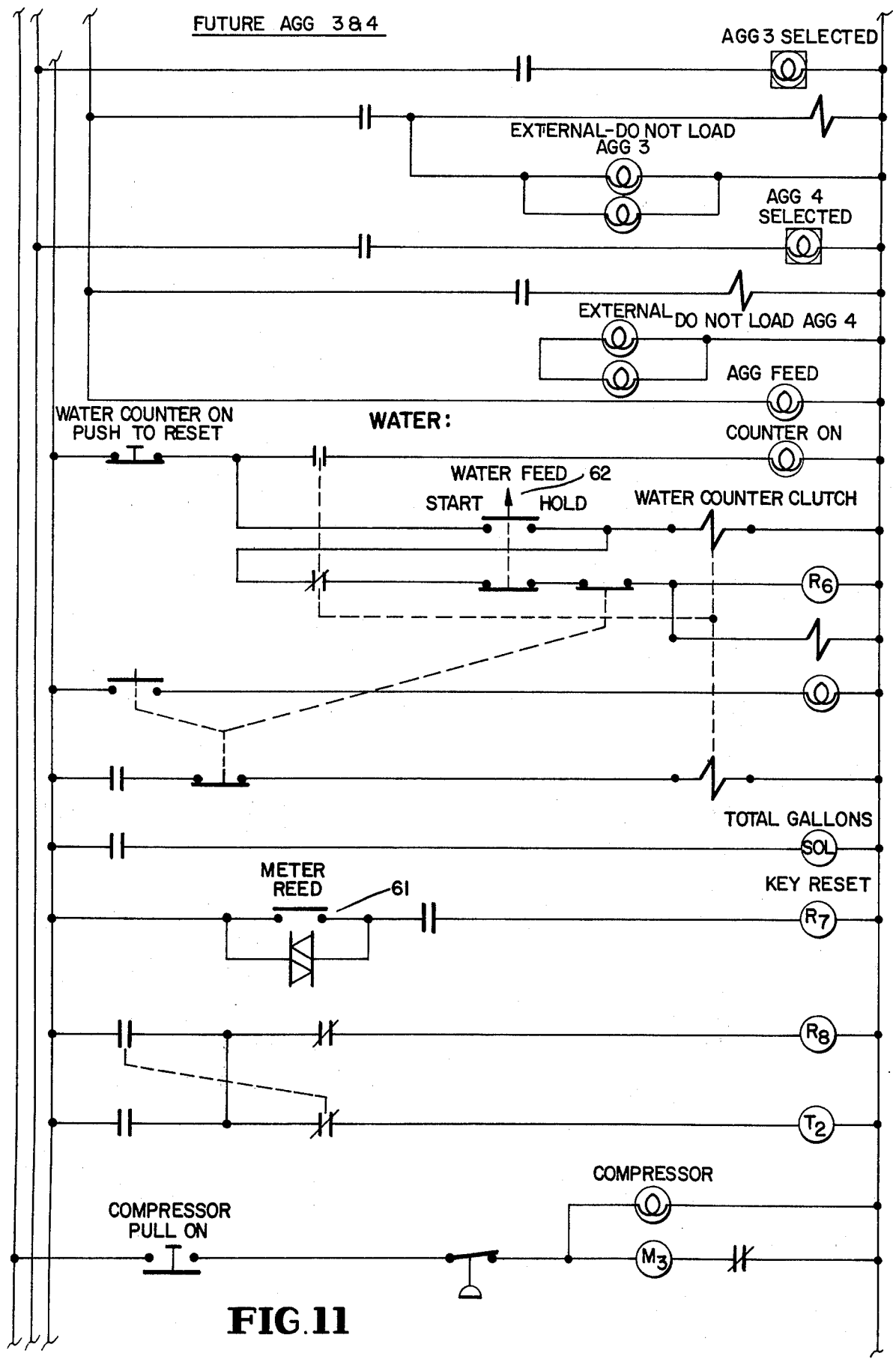

Referring now to FIG. 8, the control panel 52 will be described in association with FIGS. 9, 10 and 11. The right side of the panel 52 controls the aggregate and sand system shown electrically in FIG. 10, the left side of panel 52 controls the cement system shown electrically in FIG. 9 while the central portion of panel 52 controls the water as shown in FIG. 11.

Referring now to the schematics, the main power switch 53 is turned to the on position when the unit has been connected to a 115 VAC source the aggregate belt drive conveyor motor 49 is energized by pushing switch 54 which starts both the first and second aggregate conveyor belts in motion, the switch 54B is actuated to select first aggregate module, the switch 54A is actuated to take the scale system to zero and the feed switch 55 is energized which causes the bin gate 44 on the first aggregate to open and material to fall upon the conveyor belt. The load cell circuit subtracts the material being dispensed from the gross weight of the hopper plus material to provide a direct digital read out at 56 so that the operator may de-energize the switch 55 to close the bin gate when the desired weight has been placed on the conveyor belt 27A which transfers the material to belt 35 up to the discharge chute 29 where it is dumped into a stationary mixer or truck mixer.

Simultaneously a pre-set cement register 57 is set to establish an electrical value representative of the amount of cement to be batched. The switch 58A is actuated to take the cement scale system to zero and the cement feed gate switch 58 is energized to start the cement screw conveyor motor 34 which drives the cement screw 26 until the cement weigh hopper load cell matches the electrical value of the pre-set register 57 at which time the motor 34 cuts off and the feeding of cement ceases.

Each aggregate or sand is then dispensed in sequence on the conveyor belt 27A until the batch is completed. Only one sand or aggregate is dispensed upon the belt 27A at a time. Simultaneous dispensing of sand and aggregate can be used if each module is supplied with a separate digital indicator.

A water meter 60 shows the gallons per batch and a water counter switch 61 counts pulses, one per gallon, the water amount is preset on counter 60 and feed switch 62 is actuated. The counter cuts off automatically when amounts equals preset and shows the predetermined quantity has been dispensed.

In operation of the weigh system all materials give digital read outs. The weigh system, aggregate hoppers and cement hopper, are first tared out which zeros load cell scales after the hoppers have been filled prior to dispensing, a gross weight is taken, to insure hoppers have enough material to be batched, as the dispensing of aggregates continues the load cell on the hoppers 22 signal the digital read out so that the operator can cut off the aggregate feed when the digital read out indicates the weight has been attained.

In operation of the weigh system each of the hoppers is first filled with aggregate or sand and the cement weigh hopper is charged from the cement storage silo. The scale system is zeroized and tared out, then the load cell scale weight indicators cooperate with the digital read outs to reveal the amount of material being dispensed when the bin gates are open or the cement screw is rotating to dispense cement. The gross weight is checked so that the material left in either the cement hopper or bin is checked to assure a sufficient amount of material for the next batch. If this is not sufficient the bins or hoppers are then recharged with material. When a material is being dispensed the hoppers 22 are not recharged during the dispensing cycle because of the manner of weighing from the bins.

In weighing out the cement the cement load hopper is tared out and checked to make sure that it has at least enough material therein for the cement batch requirements. An electronic device having thumb wheels is set to generate an electrical value representative of the weight of cement to be dispensed and the auto tare is activated. The weigh start button is then energized to commence dispensement of the cement when the amount of cement dispensed by the screw has subtracted from the hopper the load cell value equal to the thumb wheel settings the cement screw stops. A gross button is pushed on the cement control to show the weight of material remaining in the cement hopper to assure a sufficient amount for the next batch, if an insufficient amount is in the cement weigh hopper then the cement button is activated to open the gate on the overhead cement tank to charge the cement weigh hopper 25 until the bin signal indicates that the weigh hopper is full.

The water is metered as hereinbefore described and while the control panel shows a straight digital read out for human optical comparison in the weighing of aggregates or sand it will be appreciated that a similar electronic system can be installed to set an electrical value which will be activated by the load cells on the aggregate hoppers 22 to shut the bin gates when the predetermined amount of sand or aggregate has been dispensed onto the conveyor belt 27A.

Each material that is sand and aggregate is sequentially dispensed so that there is only one material on the aggregate conveyors at a given time. The cement can be simultaneously fed to the discharge chute while the aggregates are being weighed. The same applies to water.

What we claim is:

1. A mobile batching plant comprising:
   a. a primary frame,
   b. a plurality of separable modular secondary frames connected in tandem draft alignment with said primary frame,
   c. a cement modular frame, hopper, storage; weighing and conveying means pivotally mounted on top of said primary frame,
   d. an aggregate hopper and dispensing gate therefor carried by each separable modular secondary frame,
   e. a first aggregate conveyor means carried by said modular secondary frames and positioned beneath the dispensing gates of each aggregate hopper,
   f. a second aggregate conveyor means carried by said primary frame and positioned beneath said cement conveying means at one end and positioned to receive aggregate from said first aggregate conveyor means,
   g. mixing means carried by said second aggregate conveyor frame positioned to receive cement from said cement conveyor and aggregate from said second aggregate conveyor, and
   h. a fifth wheel draft connection carried by said primary frame and transport wheel means connected to the rear of the last of said separable modular secondary frames for moving the plant over the highway from site to site.

2. A mobile batching plant as claimed in claim 1 wherein said cement storage weighing and conveying means comprises support means mountable on said primary frame, cement storage means pivotally connected to said support means movable between an erect operating position and a horizontal transport position, a cement weigh hopper carried by said support means positioned to be charged from said cement storage means, and enclosed screw conveyor means carried by said weigh hopper positioned to receive cement from said weigh hopper and to convey it to the mixing means carried by said primary frame vertically above said second aggregate conveyor means.

3. A mobile batching plant as claimed in claim 1 wherein said plurality of modular secondary frames are rigidly detachably connected in tandem for addition and subtraction of plural sand and aggregates to meet job requirements.

4. A mobile batching plant as claimed in claim 1 wherein said first aggregate conveyor means is an endless belt mounted to ride upon rollers supported on said modular secondary frames, the upper run of said belt passing beneath the dispensing gates for each hopper carried by a modular secondary frame.

5. A mobile batching plant as claimed in claim 1 wherein said second aggregate conveyor means comprises a first support means carried by said primary frame, a second support means pivoted to said first support means, an endless belt carried by said first and second support means, drive means for driving said endless belt and drive connecting means between said first aggregate conveyor means and said second aggregate conveyor means.

6. A mobile batching plant as claimed in claim 5 wherein said second support means of said second aggregate conveyor means is movable between a lowered conveying position and a raised transport position.

7. A mobile batching plant as claimed in claim 1 further comprising weight sensing means connected to be actuated by each hopper carried by each modular secondary frame, weight sensing means connected to be actuated by said cement weighing and conveying means and carried by said primary frame, a control panel connected to said weight sensing means to provide visual indication of the amount of cement and aggregate delivered to the mixing means, and control means connected to actuate said cement screw conveyo and said conveyor bin gates responsive to visual indication on said control panel responsive to the formulation of the batch mix.

8. A mobile batching plant, as claimed in claim 7, further comprising volumetric sensing means connected to be actuated by first aggregate conveyor means carried by said modular frames and positioned beneath the dispensing means of each aggregate hopper, volumetric sensing means connected to be activated by cement conveying means and carried by said forward frame, a control panel connected to said volumetric sensing means to provide a count system indicative of weight of the amount of cement and aggregate delivered to the mixing means and control means connected to activate said cement screw conveyor and said aggregate dispensing means responsive to predetermined count on said control panel responsive to the formulation of the batch mix.

* * * * *